United States Patent
Fan et al.

(10) Patent No.: US 8,831,184 B2
(45) Date of Patent: *Sep. 9, 2014

(54) SYSTEMS AND METHODS TO REDIRECT INCOMING CONTACTS

(71) Applicant: AT&T Intellectual Property, I, L.P., Atlanta, GA (US)

(72) Inventors: James Fan, San Ramon, CA (US); Jennifer K. Lam, Fremont, CA (US); Deva-Datta Sharma, San Ramon, CA (US); Eric Towell, Mukwonago, WI (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/863,040

(22) Filed: Apr. 15, 2013

(65) Prior Publication Data
US 2013/0230155 A1    Sep. 5, 2013

Related U.S. Application Data

(63) Continuation of application No. 12/551,423, filed on Aug. 31, 2009, now Pat. No. 8,422,644.

(51) Int. Cl.
| | | |
|---|---|---|
| *H04M 3/00* | (2006.01) | |
| *G06Q 10/10* | (2012.01) | |
| *H04M 3/51* | (2006.01) | |
| *H04M 3/58* | (2006.01) | |
| *H04M 3/523* | (2006.01) | |

(52) U.S. Cl.
CPC .......... *H04M 3/5191* (2013.01); *H04M 3/5166* (2013.01); *H04M 3/58* (2013.01); *H04M 2203/4536* (2013.01); *H04M 3/523* (2013.01)
USPC .............. 379/88.16; 370/237; 379/88.01; 379/88.18; 379/211.02; 379/215.01; 379/265.09; 709/207

(58) Field of Classification Search
CPC .............................. H04M 3/5166; G06Q 10/10
USPC ........... 370/237; 379/34, 88.01, 88.16, 88.18, 379/88.2, 211.02, 215.01, 265.09, 265.11; 709/207
See application file for complete search history.

(56) References Cited

U.S. PATENT DOCUMENTS

| | | | |
|---|---|---|---|
| 5,436,965 A | | 7/1995 | Grossman et al. |
| 5,692,033 A | * | 11/1997 | Farris ............................ 379/67.1 |
| 5,809,128 A | * | 9/1998 | McMullin ................. 379/215.01 |
| 6,018,567 A | * | 1/2000 | Dulman ..................... 379/32.03 |
| 6,097,792 A | * | 8/2000 | Thornton ..................... 379/88.2 |
| 6,314,177 B1 | | 11/2001 | Davis et al. |
| 6,711,254 B2 | | 3/2004 | Sato et al. |
| 6,970,553 B1 | * | 11/2005 | Gao et al. ................. 379/265.09 |

(Continued)

OTHER PUBLICATIONS

U.S. Office Action dated Aug. 23, 2012 in U.S. Appl. No. 12/551,423.

(Continued)

*Primary Examiner* — Gerald Gauthier
(74) *Attorney, Agent, or Firm* — Hartman & Citrin LLC

(57) ABSTRACT

Systems and methods are provided for contact channel redirection to improve agent routing/assignment efficiency and customer experience. For example, the system may redirect a customer, waiting in a queue for an agent for telephonic communications, to a chat agent for online chat.

20 Claims, 5 Drawing Sheets

(56) References Cited

U.S. PATENT DOCUMENTS

| | | |
|---|---|---|
| 7,050,569 B1 | 5/2006 | Weaver et al. |
| 7,076,032 B1 * | 7/2006 | Pirasteh et al. ............ 379/88.18 |
| 7,418,092 B2 | 8/2008 | Brown |
| 7,697,677 B2 | 4/2010 | Hack |
| 7,805,395 B2 | 9/2010 | Howard et al. |
| 7,839,803 B1 | 11/2010 | Snelgrove et al. |
| 8,422,644 B2 * | 4/2013 | Fan et al. ................... 379/88.16 |
| 8,670,323 B1 * | 3/2014 | Croak et al. ................. 370/237 |
| 2007/0041563 A1 | 2/2007 | Maierhofer et al. |
| 2007/0162553 A1 * | 7/2007 | Dewing et al. ................ 709/207 |
| 2011/0051918 A1 * | 3/2011 | Fan et al. .................. 379/211.02 |
| 2011/0116617 A1 * | 5/2011 | Fan et al. .................. 379/265.11 |
| 2013/0230155 A1 * | 9/2013 | Fan et al. ................... 379/88.01 |

OTHER PUBLICATIONS

U.S. Notice of Allowance dated Dec. 6, 2012 in U.S. Appl. No. 12/551,423.

* cited by examiner

SYSTEMS AND METHODS TO REDIRECT INCOMING CONTACTS

CROSS REFERENCE

This application is a continuation of U.S. application No. 12/551,423 entitled "Systems and Methods to Redirect Incoming Contacts," now U.S. Pat. No. 8,422,644, filed on Aug. 31, 2009 which is hereby incorporated by reference in its entirety.

FIELD OF THE TECHNOLOGY

At least some embodiments of the disclosure relate to routing incoming contacts, such as telephone calls, online chat requests, etc.

BACKGROUND

Many service providers offer customer services via telephone call centers or online chat services. Through these services a customer can reach an agent for purchasing products and services, inquiring about product information, or reporting problems.

For example, a customer may call into the interactive voice response (IVR) system to report a problem. Due to complex menu tree options or other reasons, the customer is getting impatient. The customer selects the option to talk to an agent for voice communications during the IVR interaction session. When all voice agents in the agent pool are busy with other customers, the customer is placed on hold and into an agent queue, and may encounter a long waiting time.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In one embodiment, a service provider provides different types of communication channels to reach their agents or representatives. For example, the service provider may offer a telephone number to reach agents or representatives for voice/telephonic communications, and offer a web chat service to reach agents or representatives via online chat (e.g., instant messaging, text based chat, voice and/or video enabled chat, etc.).

However, the resources of the two agent pools (e.g., voice agents and chat agents) may be used inefficiently if they are separately managed. For example, the customer may need to wait a long time for a voice connection to an agent, which causes unpleasant customer experiences. Voice agents generally receive higher pay than chat agents. While the customer is waiting for a voice agent, the more expensive voice agents may be over utilized and the cheaper chat agents underutilized.

In one embodiment, a system is provided to allow the customer to switch from the voice agent queue to a chat agent pool. For example, a resource optimization module is used to offer IVR customers the option to be redirected to a chat channel when the voice agent queue waiting time exceeds a predetermined time period, or to opt out to a chat session at their discretion. The resource optimization module may be implemented as a software module on a computer, or as a hardware module, or a combination of software and hardware.

Figure 1:
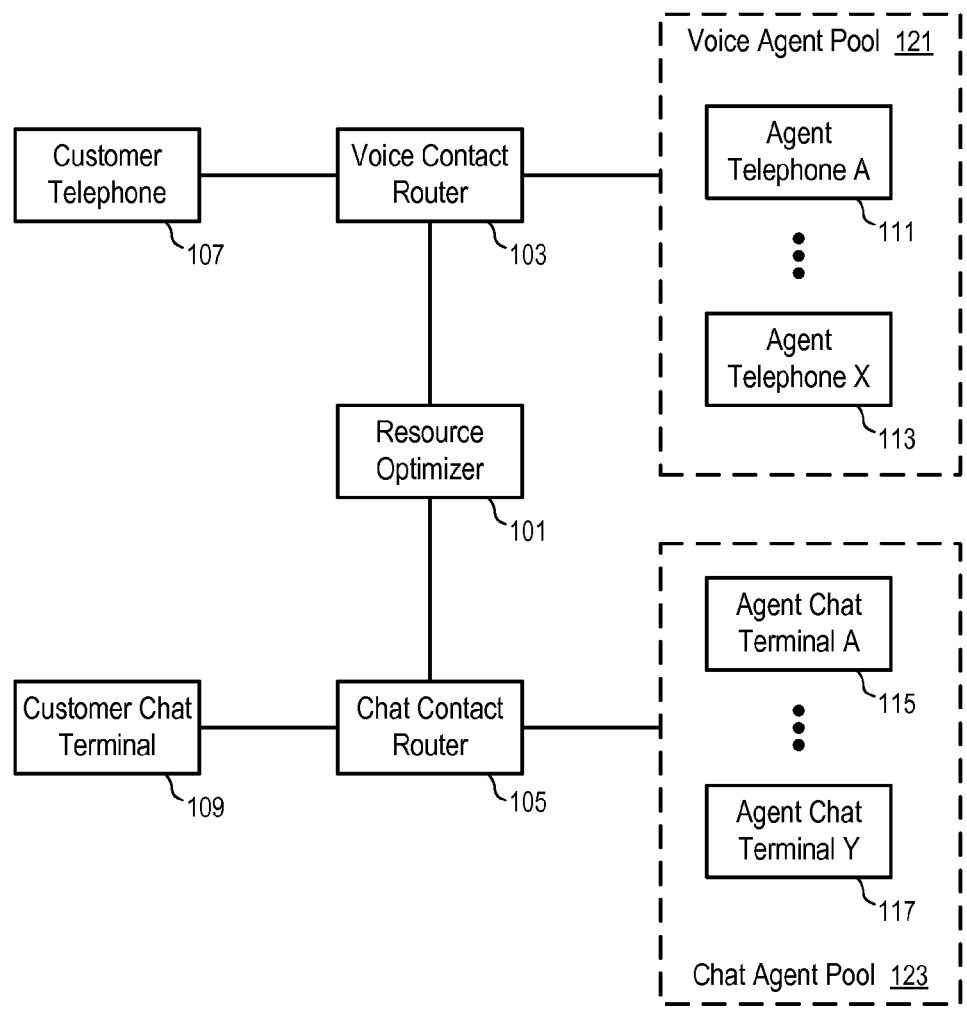
FIG. 1 shows a system to redirect incoming contacts according to one embodiment.

FIG. 1 shows a system to redirect incoming contacts according to one embodiment. In FIG. 1, a resource optimizer (101) is coupled to a voice contact router (103) and a chat contact router (105), which provide access to a voice agent pool (121) and a chat agent pool (123), respectively. The resource optimizer (101) is configured to balance the demand on the voice agent pool (121) and the chat agent pool (123).

For example, a customer may use a customer telephone (107) to make a call to the voice contact router (103), which manages a queue to route the call to the next available agent on one of the agent telephones (111-113) in the voice agent pool (121). The agent telephones (111-113) may be plain old telephone sets, or terminals for Voice over Internet Protocol (VoIP), such as softphones running as applications on one or more computers.

Alternatively, the customer may use a customer chat terminal (109) to connect to a chat contact router (105), which manages a queue to route the incoming online chat connections to the next available agent on one of the agent chat terminals (115-117). The chat terminals (115-117) may be computer terminals connected to one or more computers. The chat terminals (115-117) may also be implemented via personal computers, network computers, notebook computers, etc.

In one embodiment, the resource optimizer (101) is configured to balance the load between the voice contact router (103) and the chat contact router (105). For example, when the waiting line for the voice contact router (103) is longer than a predetermined length, or the waiting time is longer than a predetermined threshold, the resource optimizer (101) may suggest the customer to move to the chat contact router (105) for a chat agent, instead of waiting for a voice agent.

In one embodiment, the resource optimizer (101) is configured to facilitate the transition from a queue in the voice contact router (103) to the queue in the chat contact router (105).

In some embodiments, when the chat contact router (105) is over utilized, the resource optimizer (101) may attempt to move requests from the chat contact router (105) to the voice contact router (103).

Figure 2:
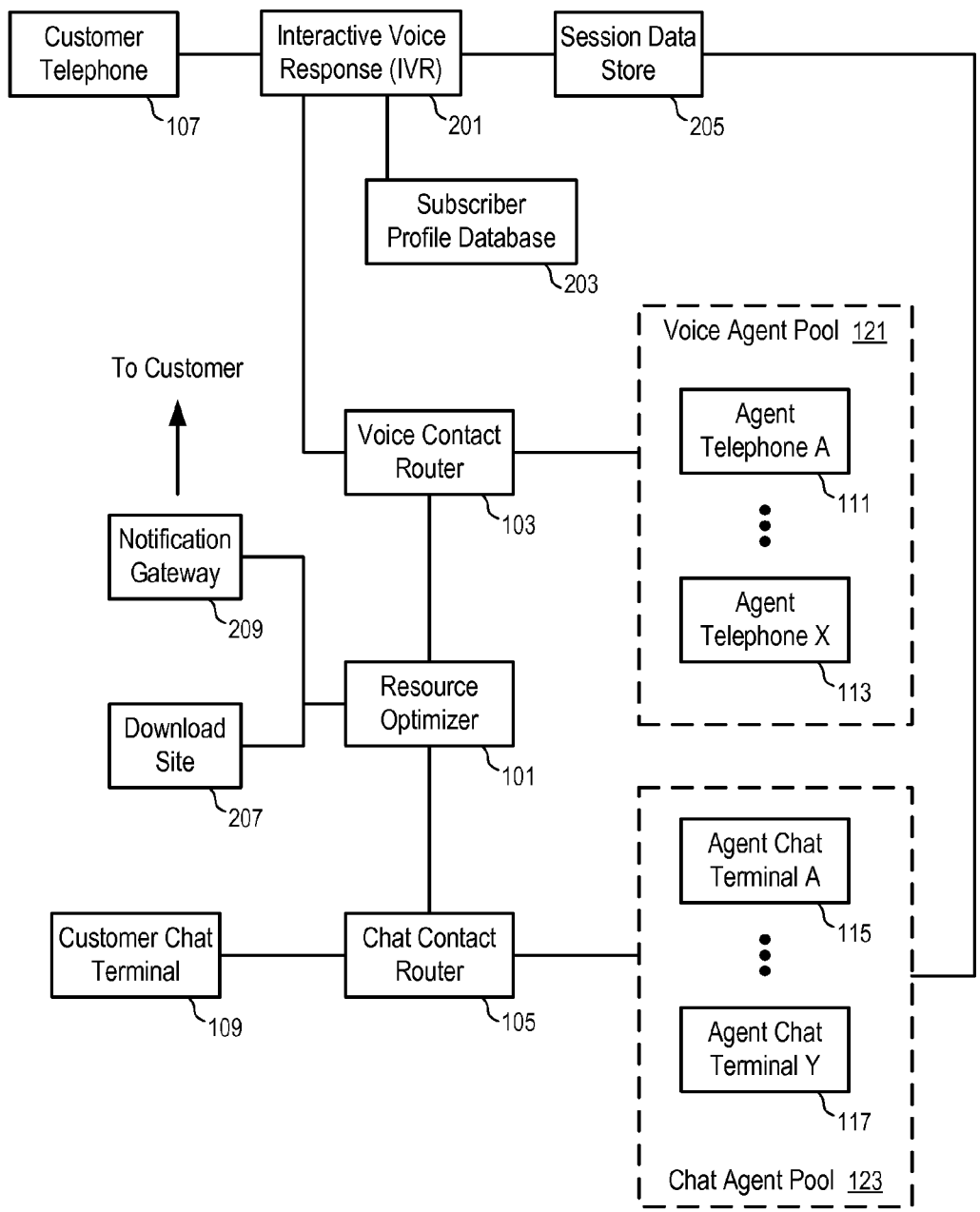
FIG. 2 shows a system to redirect incoming telephone calls according to one embodiment.

FIG. 2 shows a system to redirect incoming telephone calls according to one embodiment. In FIG. 2, the customer telephone (107) communicates with an interactive voice response (IVR) module (201) to identify the customer using the subscriber profile database (203). The IVR module (201) opens a session in the session data store to store data related to the communication session initiated by the telephone call from the customer telephone (107). The IVR module (201) couples with the voice contact router (103) to route the telephone call to one of the agent telephones (111-113) in the voice agent pool (121).

In one embodiment, the resource optimizer (101) monitors the waiting line in the queue of the voice contact router (103). When the waiting time for the telephone call from the customer telephone (107) is determined to be longer than a predetermined threshold, the resource optimizer (101) may communicate with the IVR module (201) to initiate the transfer of the customer to a chat connection.

For example, the IVR module (201) may be used to prompt the customer to switch to a chat connection, instead of waiting for a voice connection to a voice agent. If the customer accepts the suggestion, the resource optimizer (101) may use the notification gateway (209) to send a communication to the customer to facilitate the transfer.

For example, the communication may be an email message, or a text message sent to the mobile phone of the customer (e.g., via a short message service (SMS)). The resource optimizer (101) may identify the email address of the customer, or the telephone number of the mobile phone of the customer, via the subscriber profile database, or via the IVR system.

For example, the communication may include a uniform resource locator (URL) pointing to the download site (207). When the customer chat terminal (109) (e.g., a computer of the customer) visits the URL, a chat software program is downloaded to the customer chat terminal (109) (if the customer chat terminal does not have the chat software program) and the chat software program is used to initiate a chat connection to the chat contact router (105), which routes the incoming chat connection from the customer chat terminal (109) to one of the agent chat terminals (115-117) in the chat agent pool (123).

In one embodiment, the chat contact router (105) includes a chat utility to correlate the online chat connection from the customer chat terminal (109) with the session initiated by the IVR module (201) for the telephone call from the customer telephone (107). The chat contact router (105) allows the online chat connection to continue the session (e.g., by allowing access to the data recorded in the session and adding additional data to the session for the online chat connection).

For example, the URL may include a parameter (e.g., a priority code) to indicate the telephone session with the customer telephone (107); and the chat contact router (105) uses the parameter to assign priority to the online connection from the customer chat terminal (109) based on the time the telephone call from the customer telephone (107) is received.

In some embodiments, the chat contact router (105) correlates the online chat connection from the customer chat terminal (109) with the session initiated for the telephone call from the customer telephone (107) based on an identity of the customer. The identity of the customer may be identified based on an authentication process (e.g., using the subscriber profile database (203), based on the telephone number of the customer, or based on a priority code provided by the resource optimizer (101).

For example, when the customer accepts the suggestion for a transfer to a chat connection, the resource optimizer (101) may assign a priority code to represent the session. The resource optimizer (101) may provide the priority code to the customer via the notification gateway (209), and/or via the IVR module (201). When the chat contact router (105) obtains the priority code from the customer chat terminal (109), the chat contact router (105) provides the online chat connection from the customer chat terminal (109) with the priority of the telephone call from the customer telephone (107), and bridges the online chat session initiated by the online chat connection from the customer chat terminal (109) and the telephone session initiated by the telephone call from the customer telephone (107).

In some embodiments, the download site (207) may require the customer to sign in as a member. Once the customer is authenticated, the resource optimizer (101) can correlate the visit to the download site (207) with the telephone call from the customer telephone (107), and allows the chat contact router to bridge the online chat session and the telephone session, when the online chat session is from the customer as an authenticated member.

In one embodiment, the voice contact router (103) is implemented via a software module running on a computer system. The voice contact router (103) includes logic to select an available voice agent to handle the incoming IVR contact session. For an incoming IVR session, the voice contact router (103) selects and routes the session to an agent equipped with telephone capability. Existing technologies, implemented via software, hardware, or a combination of software and hardware, can be used for voice contact router (103).

In one embodiment, the resource optimizer (101) is implemented via a software module running on a computer system. In some embodiments, the resource optimizer (101) is implemented in a way that is independent from the vendors of the voice contact router (103) and/or the chat contact router (105). The resource optimizer (101) is configured to maintain an association of subscriber accounts to active sessions for all the channels, including IVR and chat sessions. The resource optimizer (101) receives live session information from the voice contact router (103) and the chat contact router (105). The resource optimizer (101) provides for the integration of sessions between IVR and chat channels from different vendors.

In one embodiment, the notification gateway (209) provides notification via emails. The notification gateway (209) generates a notification email in an automated way for delivery to the email address of the customer (e.g., subscriber). The notification email may include the URL to download the chat software program and/or the priority code.

In one embodiment, the chat contact router (105) is implemented via a software module running on a computer system. The chat contact router (105) includes logic to select an available chat agent to handle the incoming chat contact session request. For an incoming chat session request, the chat contact router (105) selects and routes the session to an agent equipped with computer capability.

In one embodiment, the subscriber profile database (203) contains information about products and services a subscriber has already ordered, pending order information, and billing status, as well as recently reported trouble information.

In one embodiment, the session data store (205) logs customer interaction activities of individual contact sessions. In one embodiment, the session data store (205) works closely with the resource optimizer (101), and is independent of the voice contact router (103) and chat contact router (105).

Figure 3:
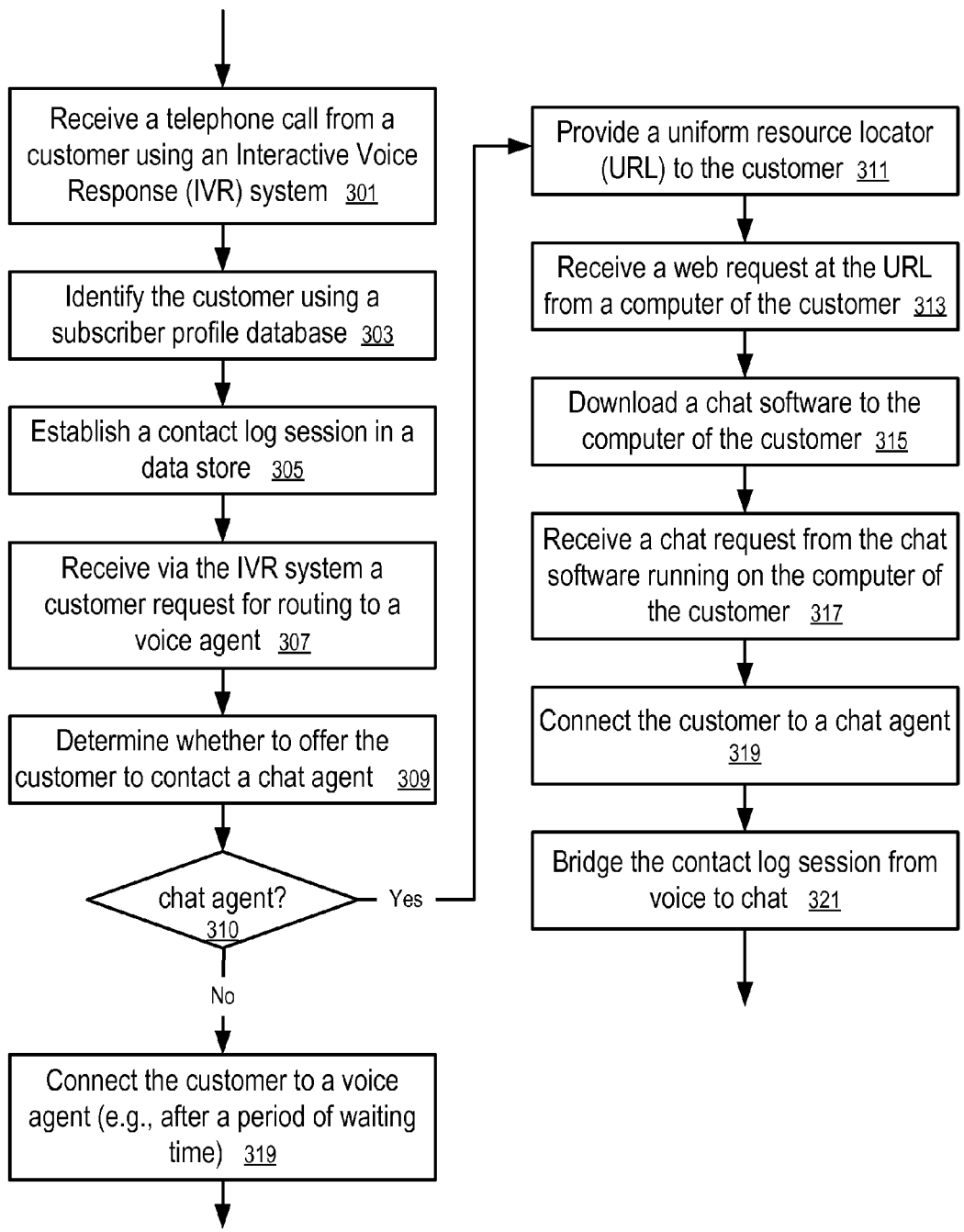
FIG. 3 shows a method to redirect requests for voice agents to online chat agents according to one embodiment.

FIG. 3 shows a method to redirect requests for voice agents to online chat agents according to one embodiment. In FIG. 3, after an Interactive Voice Response (IVR) system (201) (e.g., of a call center) receives (301) a telephone call from a customer, the IVR system (201) identifies (303) the customer using a subscriber profile database (203).

In one embodiment, the IVR system (201) may identify the customer based on the telephone number of the customer telephone (107), or may communicate with the customer to identify the customer.

In one embodiment, the IVR system (201) accesses the subscriber profile database (203) to obtain information about the customer and establishes (305) a contact log session in a data store (205).

After the IVR system (201) receives a customer request for routing (307) the telephone call to a voice agent, the resource optimizer (101) may determine (309) whether to offer the customer to contact a chat agent.

For example, when all voice agents are busy with other calls, the resource optimizer (101) may determine if there are chat agents available. If the resource optimizer (101) determines that there is a chat agent available to handle a customer contact session, the resource optimizer (101) may cause the IVR system (201) to provide the customer with the option to wait for a voice agent and the option to launch a chat session. For example, the IVR system may prompt the customer to choose between: "option 1 to wait 20 minutes for a voice agent, or option 2 to launch a chat session to get immediate attention." If the customer agrees to use a chat session, the system starts to assist the customer in switching to a chat connection.

In FIG. 3, if operation (310) determines that the customer does not want a chat agent, the voice contact router (103) keeps the customer in a queue and connects (319) the customer to a voice agent (e.g., after a period of waiting time).

If operation (310) determines that the customer agrees to use a chat session, the resource optimizer (101) provides (311) a uniform resource locator (URL) to the customer.

For example, the resource optimizer (101) may use the IVR system to speak the chat URL to the customer, and/or send the URL to the customer through the notification gateway (209) (e.g., via a text message to a mobile phone of the customer, or via an email to a known email address of the customer).

In FIG. 3, when the download site (207) receives (313) a web request at the URL from a computer of the customer (e.g., the customer chat terminal (109)), the download site (207) downloads (315) a chat software module to the computer of the customer. The computer of the customer may download, install and start the chat software in an automated way, based on the instructions provided at the URL.

In one embodiment, the URL includes a priority code to correlate the online chat connection resulting from the URL with the telephone call of the customer.

When the chat contact router (105) receives (317) a chat request from the chat software running on the computer of the customer, the chat contact router (105) connects (319) the customer to a chat agent using one of the agent chat terminals (115-117) in the chat agent pool (123). The resource optimizer (101) and/or the chat contact router (105) bridges (321) the contact log session from telephonic voice to online chat.

In one embodiment, the URL is presented via a web site of the service provider. After the consumer logs into his/her own account with the service provider, the home page may provide a link or icon pointing to the URL. The link or icon may say "chat now." When the customer chat terminal (109) selects the link, the installation and/or initialization of the chat software starts.

In some embodiments, the chat contact router (105) and/or the resource optimizer (101) automatically bridges the online chat session and the previous IVR session. In other embodiments, the user interface for the chat application may present an option selectable to transfer or bridge the previous IVR session.

In one embodiment, after the chat contact router (105) and/or the resource optimizer (101) bridges the online chat session and the previous IVR session, the chat contact router (105) connects the customer to a chat agent along with the relevant information previously collected in the IVR session.

In one embodiment, when the customer agrees to transfer from an IVR session to a chat session, the IVR system (201) gives the customer a priority code. When the customer initiates the online chat connection with the priority code, the chat contact router (105) and/or the resource optimizer (101) bridges the online chat session and the previous IVR session.

In one embodiment, when the customer initiates the online chat connection and provides his/her telephone number (or other identifiers), the chat contact router (105) and/or resource optimizer (101) can determine that the customer already has an IVR session. The chat user interface may prompt the user to decide whether or not to bridge the previous IVR session and the current chat session. If the customer selects to bridge the sessions, the chat contact router (105) connects the customer to a chat agent along with the relevant information previously collected in the IVR session.

Figure 4:
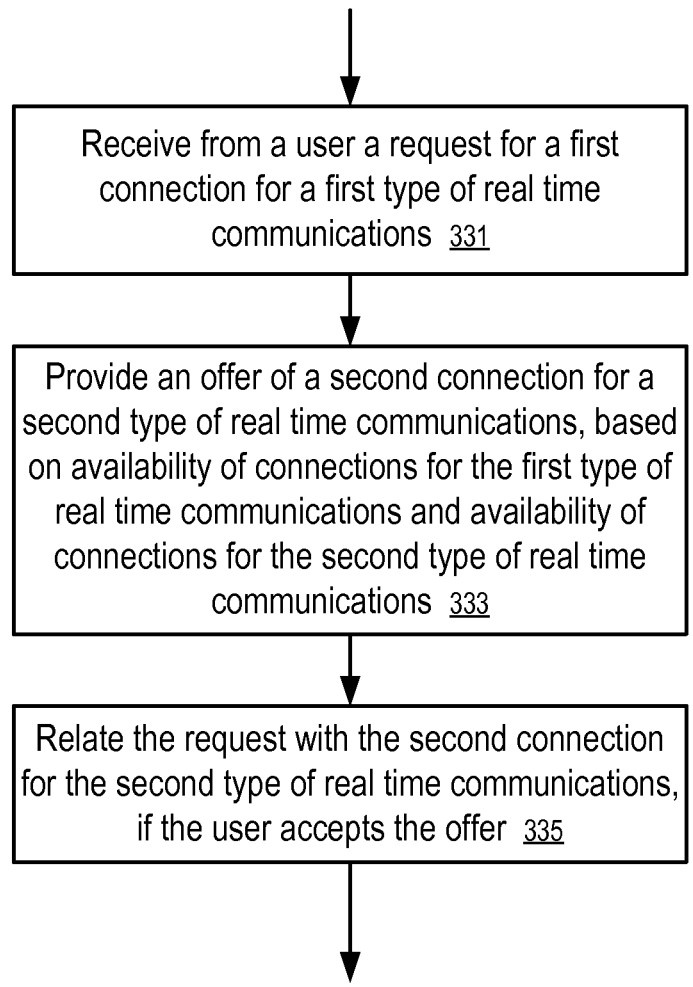
FIG. 4 shows a method to redirect incoming contacts according to one embodiment.

FIG. 4 shows a method to redirect incoming contacts according to one embodiment.

In FIG. 4, a resource optimizer (101) receives (331) from a user a request for a first connection for a first type of real time communications. The resource optimizer (101) provides (333) an offer of a second connection for a second type of real time communications, based on availability of connections for the first type of real time communications and availability of connections for the second type of real time communications. If the user accepts the offer, the resource optimizer (101) relates (335) the request with the second connection for the second type of real time communications.

In one embodiment, real time communications of the first type are telephonic communications; and real time communications of the second type are instant messaging (e.g., online chat via text, voice, and/or video).

In one embodiment, the first type of real time communications are connected to telephones; and the second type of real time communications are connected to applications running on computers.

In one embodiment, the session data store (205) initiates a log session based on the request received via the first type of real time communications, and continues (205) the log session after the second connection is established for the second type of real time communications.

In one embodiment, the resource optimizer (101) identifies an identity of the user based on the first type of real time communications, using a subscriber profile database (203) and based on communications received in an interactive voice response (IVR) system (201).

In one embodiment, the resource optimizer (101) is configured to provide the offer when no agent is currently available for communicating with the user using the first type of real time communications, and there is at least one agent who is currently available for communicating with the user using the second type of real time communications.

In one embodiment, the resource optimizer (101) is configured to provide the offer when a waiting time for an agent for the first type of real time communications is above a predetermined threshold.

In one embodiment, the resource optimizer (101) relates the request with the second connection for the second type of real time communications via a reference provided to the user. The reference may include a uniform resource locator (URL) and/or a priority code, which when visited by a computer of the user, causes the computer of the user to download a software module for communicating via the second type of real time communications. A notification gateway (209) may provide the URL via email or text message. Alternatively or in combination, the URL can be provided via the IVR system (201).

In one embodiment, the resource optimizer (101) provides the second connection with a priority according to a time at which the request is received via communications of the first type.

In one embodiment, the resource optimizer (101) provides the second connection with priority in accordance with the priority code in a queue for requests for connections for the second type of real time communications.

Thus, at least in one embodiment, a system and method is provided for contact channel redirection to improve agent routing/assignment efficiency and customer experience. Without the system, a frustrated customer is likely to hang up. If this was a sales call, the service provider may lose the potential revenue, resulting in poor customer retention. The system provides a better customer contact experience since the customer is assigned a priority chat code to be able to chat with an agent immediately.

In one embodiment, the system moves contact sessions from a more expensive IVR agent pool to a less expensive chat agent pool, resulting in cost savings. The system provides the ability to integrate voice contact routing and chat contact routing technologies from different vendors, and thus achieve cost savings driven by process integration.

Figure 5:
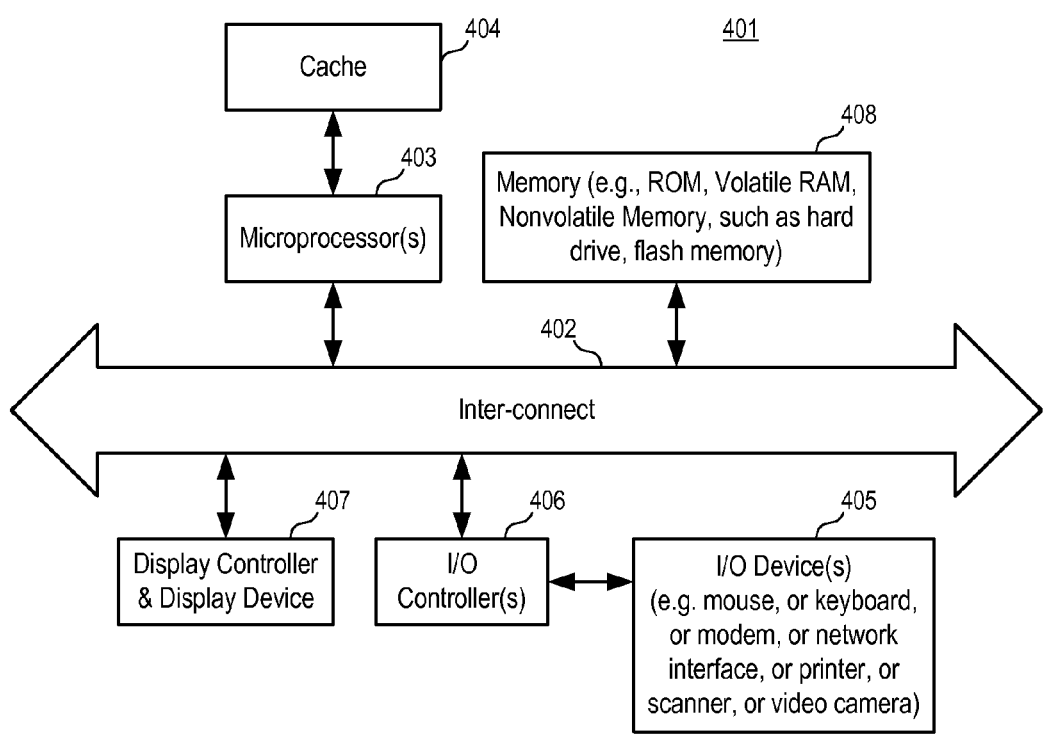
FIG. 5 shows a data processing system, which can be used in various embodiments.

FIG. 5 shows a data processing system, which can be used in various embodiments. While FIG. 5 illustrates various components of a computer system, FIG. 5 is not intended to represent any particular architecture or manner of interconnecting the components. Some embodiments may use other systems that have fewer or more components than those shown in FIG. 5.

In one embodiment, each of the modules, such as the IVR module (201), the voice contact router (103), the resource optimizer (101), the chat contact router (105), the download site (207), the notification gateway (209), and the host(s) for the subscriber profile database (203) and the session data store (205) can be implemented as a data processing system, with more or less components, as illustrated in FIG. 5. Some of the modules may be implemented via software running on separate data processing systems or a shared data processing system.

In FIG. 5, the data processing system (401) includes an inter-connect (402) (e.g., bus and system core logic), which interconnects a microprocessor(s) (403) and memory (408). The microprocessor (403) is coupled to cache memory (404) in the example of FIG. 5.

The inter-connect (402) interconnects the microprocessor(s) (403) and the memory (408) together and also interconnects them to a display controller, display device (407), and to peripheral devices such as input/output (I/O) devices (405) through an input/output controller(s) (406).

Typical I/O devices include mice, keyboards, modems, network interfaces, printers, scanners, video cameras, and other devices which are well known in the art. In some embodiments, when the data processing system is a server system, some of the I/O devices, such as printer, scanner, mice, and/or keyboards, are optional.

The inter-connect (402) may include one or more buses connected to one another through various bridges, controllers and/or adapters. In one embodiment, the I/O controller (406) includes a USB (Universal Serial Bus) adapter for controlling USB peripherals, and/or an IEEE-1394 bus adapter for controlling IEEE-1394 peripherals.

The memory (408) may include ROM (Read Only Memory), volatile RAM (Random Access Memory), and non-volatile memory, such as hard drive, flash memory, etc.

Volatile RAM is typically implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, various functions and operations may be described as being performed by or caused by software code to simplify description. However, those skilled in the art will recognize that what is meant by such expressions is that the functions result from execution of the code/instructions by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms, and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data, which when executed by a data processing system, causes the system to perform various methods. The executable software and data may be stored in various places including, for example, ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in the same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include, but are not limited to, recordable and non-recordable type media such as volatile and non-volatile memory devices, read only memory (ROM), random access memory (RAM), flash memory devices, floppy and other removable disks, magnetic disk storage media, optical storage media (Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a tangible machine readable medium includes any mechanism that provides (i.e., stores and/or transmits) information in a form accessible by a machine (a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system, comprising:
    an interactive voice response module to receive a telephone call from a user;
    a memory to host a subscriber profile database and a contact log session data store, the interactive voice response module to use the subscriber profile database to identify the user and use the contact log session data store to store data related to a communication session initiated by the telephone call;
    a telephone call router coupled to the interactive voice response module to route the telephone call to one of a plurality of telephones;
    a resource optimizer coupled with the telephone call router to
        offer the user an online chat connection if a waiting time for routing the telephone call through to one of the plurality of telephones is determined to be longer than a predetermined threshold, and
        in response to receiving an acceptance from the user to use the online chat connection, assign a priority code to an online chat session initiated by the online chat connection; and
    an online chat router to
        route the online chat connection to a first terminal of one of a plurality of computer user terminals and to allow the first terminal to access, during the online chat session initiated by the online chat connection, the data related to the communication session initiated by the telephone call,
        obtain the priority code, and
        based on the priority code, provide the online chat connection with a priority corresponding to the telephone call.

2. The system of claim 1, further comprising:
    a notification gateway to transmit a uniform resource locator to the user to initiate the online chat connection.

3. The system of claim 2, further comprising:
    a computer hosting a web server coupled to the resource optimizer, the web server to download an online chat software program to a computer of the user when the user uses the computer to visit the uniform resource locator, wherein the online chat connection is established via the online chat software program downloaded from the web server.

4. The system of claim 2, wherein the notification gateway transmits the uniform resource locator via one of: email and text message.

5. The system of claim 1, further comprising:
    a computer hosting a web server coupled to the resource optimizer, wherein the web server is configured to identify the user, facilitate initiation of the online chat connection, and correlate the online chat connection with the telephone call.

6. The system of claim 5, wherein the web server correlates the online chat connection with the telephone call via receiving a telephone number from the user.

7. A method, comprising:
    receiving, at an interactive voice response module, a telephone call from a user;
    identifying, by the interactive voice response module, the user based on a subscriber profile database;
    storing, by the interactive voice response module, data related to a communication session initiated by the telephone call to a contact log session data store;
    routing, by a telephone call router coupled to the interactive voice response module, the telephone call to one of a plurality of telephones;
    offering, by a resource optimizer coupled with the telephone call router, the user an online chat connection if a waiting time for routing the telephone call through to one of the plurality of telephones is determined to be longer than a predetermined threshold;

in response to receiving an acceptance from the user to use the online chat connection, assigning, by the resource optimizer, a priority code to an online chat session initiated by the online chat connection;

routing, by an online chat router, the online chat connection to a first terminal of one of a plurality of computer user terminals;

allowing, by the online chat router, the first terminal to access, during the online chat session initiated by the online chat connection, the data related to the communication session initiated by the telephone call;

obtaining, by the online chat router, the priority code; and based on the priority code, providing, by the online chat router, the online chat connection with a priority corresponding to the telephone call.

8. The method of claim 7, further comprising transmitting a uniform resource locator to the user to initiate the online chat connection.

9. The method of claim 8, further comprising downloading an online chat software program to a computer of the user when the user uses the computer to visit the uniform resource locator, wherein the online chat connection is established via the online chat software program downloaded from the web server.

10. The method of claim 8, wherein the uniform resource locator is transmitted via one of: email and text message.

11. The method of claim 7, further comprising:
identifying, by a web server hosted by a computer coupled to the resource optimizer, the user;
facilitating, by the web server, initiation of the online chat connection; and
correlating the online chat connection with the telephone call.

12. The method of claim 11, wherein the online chat connection is correlated with the telephone call via a telephone number received from the user.

13. The method of claim 7, wherein offering the user the online chat connection if the waiting time for routing the telephone call through to one of the plurality of telephones is determined to be longer than the predetermined threshold comprises providing the user with a first option to wait to route the telephone call through to one of the plurality of telephones and a second option to use the online chat connection.

14. A tangible machine readable medium storing instructions that, when executed by a processor, cause the processor to perform operations comprising:
receiving a telephone call from a user;
identifying the user based on a subscriber profile database;
storing data related to a communication session initiated by the telephone call to a contact log session data store;
routing the telephone call to one of a plurality of telephones;
offering the user an online chat connection if a waiting time for routing the telephone call through to one of the plurality of telephones is determined to be longer than a predetermined threshold;
in response to receiving an acceptance from the user to use the online chat connection, assigning a priority code to an online chat session initiated by the online chat connection;
routing the online chat connection to a first terminal of one of a plurality of computer user terminals;
allowing the first terminal to access, during the online chat session initiated by the online chat connection, the data related to the communication session initiated by the telephone call;
obtaining the priority code; and
based on the priority code, providing the online chat connection with a priority corresponding to the telephone call.

15. The tangible machine readable medium of claim 14, wherein the operations further comprise transmitting a uniform resource locator to the user to initiate the online chat connection.

16. The tangible machine readable medium of claim 15, further comprising downloading an online chat software program to a computer of the user when the user uses the computer to visit the uniform resource locator, wherein the online chat connection is established via the online chat software program downloaded from the web server.

17. The tangible machine readable medium of claim 15, wherein the uniform resource locator is transmitted via one of: email and text message.

18. The tangible machine readable medium of claim 14, wherein the operations further comprise:
identifying the user;
facilitating initiation of the online chat connection; and
correlating the online chat connection with the telephone call.

19. The tangible machine readable medium of claim 18, wherein the online chat connection is correlated with the telephone call via a telephone number received from the user.

20. The tangible machine readable medium of claim 14, wherein offering the user the online chat connection if the waiting time for routing the telephone call through to one of the plurality of telephones is determined to be longer than the predetermined threshold comprises providing the user with a first option to wait to route the telephone call through to one of the plurality of telephones and a second option to use the online chat connection.

* * * * *